(12) United States Patent
DeLuca et al.

(10) Patent No.: US 9,710,217 B2
(45) Date of Patent: *Jul. 18, 2017

(54) IDENTIFYING THE POSITIONING IN A MULTIPLE DISPLAY GRID

(71) Applicant: International Business Machines Corporation, Armonk, NY (US)

(72) Inventors: Lisa Seacat DeLuca, Baltimore, MD (US); Aaron J. Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/298,532

(22) Filed: Oct. 20, 2016

(65) Prior Publication Data

US 2017/0147273 A1    May 25, 2017

Related U.S. Application Data

(63) Continuation of application No. 15/053,223, filed on Feb. 25, 2016, now Pat. No. 9,547,467, which is a continuation of application No. 14/951,788, filed on Nov. 25, 2015.

(51) Int. Cl.
*G09G 5/00* (2006.01)
*G06F 3/14* (2006.01)
*G09G 5/14* (2006.01)

(52) U.S. Cl.
CPC .............. *G06F 3/1446* (2013.01); *G09G 5/14* (2013.01); *G09G 2370/02* (2013.01)

(58) Field of Classification Search
CPC ...... G06F 3/1446; G06F 3/1431; G06F 3/041; G06F 3/1423; G09G 2300/026; G02F 1/13336; H04N 9/12

USPC ........... 345/1.3, 7, 156–184, 443, 473, 633; 715/784; 348/77, 14.01; 463/13, 17, 32
See application file for complete search history.

(56) References Cited

U.S. PATENT DOCUMENTS

| | | |
|---|---|---|
| 7,453,418 B2 | 11/2008 | Palmquist |
| 8,456,381 B2 | 6/2013 | Pering et al. |
| 9,224,358 B2 | 12/2015 | Drake et al. |
| 9,547,467 B1 | 1/2017 | DeLuca et al. |

(Continued)

FOREIGN PATENT DOCUMENTS

| | | |
|---|---|---|
| EP | 1728951 A1 | 12/2006 |
| WO | 2009086468 A1 | 7/2009 |
| WO | 2011120142 A1 | 10/2011 |

OTHER PUBLICATIONS

"Appendx P: List of IBM Patents or Patent Applications Treated as Related", Dated Feb. 17, 2017, pp. 1-2.

(Continued)

*Primary Examiner* — Prabodh M Dharia
(74) *Attorney, Agent, or Firm* — Edward J. Wixtead, III

(57) ABSTRACT

In an approach for determining relative positioning in a multiple display grid, a processor receives positioning information from sensors operably affixed to at least a first display and a second display. A processor analyzes the positioning information to determine a relative positioning between at least the first display and the second display. A processor generates an extended display on the at least the first display and the second display, based on the analyzed positioning information.

1 Claim, 3 Drawing Sheets

(56) References Cited

U.S. PATENT DOCUMENTS

| | | | |
|---|---|---|---|
| 2006/0233046 A1* | 10/2006 | Fluhler | G01V 1/001 367/11 |
| 2007/0120762 A1* | 5/2007 | O'Gorman | G06F 1/1616 345/1.1 |
| 2007/0250568 A1* | 10/2007 | Dunn | H04L 12/1813 709/204 |
| 2010/0201787 A1* | 8/2010 | Zehavi | G01S 5/16 348/48 |
| 2010/0253688 A1* | 10/2010 | Cui | G01S 13/723 345/443 |
| 2011/0047489 A1* | 2/2011 | Orr | G06F 3/0482 715/764 |
| 2011/0167110 A1* | 7/2011 | Hoffberg | G05B 15/02 709/203 |
| 2012/0069131 A1* | 3/2012 | Abelow | G06Q 10/067 348/14.01 |
| 2013/0088446 A1* | 4/2013 | Sirpal | G06F 3/1438 345/173 |
| 2013/0147760 A1 | 6/2013 | Lai et al. | |
| 2013/0293452 A1* | 11/2013 | Ricci | G02B 27/01 345/156 |
| 2013/0322537 A1 | 12/2013 | Rossato et al. | |
| 2013/0339391 A1* | 12/2013 | Lindsey | G06F 17/30949 707/792 |
| 2014/0098006 A1 | 4/2014 | Jenks et al. | |
| 2014/0172557 A1 | 6/2014 | Eden et al. | |
| 2014/0184471 A1 | 7/2014 | Martynov et al. | |
| 2014/0184628 A1* | 7/2014 | Lee | G06F 3/1423 345/545 |
| 2014/0184950 A1 | 7/2014 | Chu et al. | |
| 2014/0225816 A1* | 8/2014 | Shi | G02B 26/0833 345/84 |
| 2014/0225887 A1* | 8/2014 | Aguirre-Valencia | H04N 13/0022 345/419 |
| 2014/0375558 A1* | 12/2014 | Conness | H04N 5/60 345/156 |
| 2015/0041663 A1 | 2/2015 | Oliver et al. | |
| 2015/0077310 A1* | 3/2015 | Inamoto | G06F 3/1446 345/1.3 |
| 2015/0096352 A1 | 4/2015 | Peterson et al. | |
| 2015/0100167 A1 | 4/2015 | Sloo et al. | |
| 2015/0177978 A1 | 6/2015 | Kuo et al. | |
| 2015/0186029 A1* | 7/2015 | Khani | G06F 3/1423 345/173 |
| 2015/0310698 A1* | 10/2015 | Polis | G07F 17/34 463/20 |
| 2015/0355708 A1 | 12/2015 | Lee et al. | |
| 2015/0356894 A1 | 12/2015 | Petrocy et al. | |
| 2015/0370322 A1* | 12/2015 | Gustafson | G06F 3/1423 345/156 |
| 2016/0041669 A1* | 2/2016 | de Paz | G06F 3/1438 345/173 |
| 2016/0048283 A1* | 2/2016 | Yang | G06F 3/0488 715/784 |
| 2016/0085302 A1* | 3/2016 | Publicover | H04N 5/23229 345/633 |
| 2016/0110907 A1* | 4/2016 | Kelly | A63F 13/25 345/473 |
| 2016/0170516 A1 | 6/2016 | Crandall et al. | |

OTHER PUBLICATIONS

U.S. Appl. No. 14/951,788, filed Nov. 25, 2015; Entitled "Identifying the Positioning in a Multiple Display Grid".

U.S. Appl. No. 15/298,393, filed Oct. 20, 2016; Entitled "Identifying the Positioning in a Multiple Display Grid".

Czajkowski, et al., "Resource Co-Allocation in Computational Grids", IEEE, The Eighth International Symposium on High Performance Distributed Computing, 1999, pp. 219-228, ISSN 1082-8907.

Hereld, et al., "Introduction to Building Projection-based Tiled Display Systems", IEEE, Computer Graphics and Applications, Jul.-Aug. 2000, vol. 20, Issue: 4, pp. 22-28, ISSN 0272-1716.

"Intelligent Wireless Data App", NEC Display Solutions, Ltd., Jun. 21, 2015, pp. 1-4, Printed Jul. 6, 2015, <https://play.google.com/store/apps/details?id=com.necdisplay.IntlWirelessDataApp&hl=en>.

"Intelligent Wireless Data App Operating Guide", NEC Display Solutions, Ltd., Ver. 1 Jan. 2014, © 2013, pp. 1-12.

"Multi-monitor", Wikipedia, the free encyclopedia, pp. 1-6, Printed Jul. 6, 2015, last modified Jun. 10, 2015, <https://en.wikipedia.org/wiki/Multi-monitor>.

"Large Screen LCD: NEC Video Wall LCDs Series", NEC Display Solutions, Printed Jul. 15, 2015, pp. 1-2 <http://www.necdisplay.com/documents/ColorBrochures/X464UNV.X464UN.554UN.554UNS_SpecBrochure.pdf>.

* cited by examiner

IDENTIFYING THE POSITIONING IN A MULTIPLE DISPLAY GRID

BACKGROUND

The present invention relates generally to the field of display grids, and more particularly to dynamically determining the relative positioning of a multiple display grid and adjusting the images transmitted to the displays of the multiple display grid.

A display device is an output device for the presentation of information in visual or tactile form. When the input information is supplied as an electric signal, the display is called an electronic display. Common applications for electronic visual displays are televisions and computer monitors. Originally, computer monitors were used for data processing and television receivers were used for entertainment. As time progressed, computers, and computer monitors, have been used for both data processing and entertainment, while televisions have implemented some computer functionality.

SUMMARY

Aspects of an embodiment of the present invention disclose a method, computer program product, and computing system for determining relative positioning in a multiple display grid. A processor receives positioning information from sensors operably affixed to at least a first display and a second display. A processor analyzes the positioning information to determine a relative positioning between at least the first display and the second display. A processor generates an extended display on the at least the first display and the second display, based on the analyzed positioning information.

DETAILED DESCRIPTION

With the current state of multiple display grids, a static manual configuration is required of the displays with regard to the relative position to one another. Embodiments of the present invention recognize that many users leverage two or more monitors, some of which may be attached to a laptop, such that the operating system's desktop/workspace spans the two or more monitors. Currently, the user enters a configuration panel in the operating system and indicates the position of the displays relative to one another. Additionally, embodiments of the present invention recognize that moving a display from the original position could lead to confusion, mistakes, or other problems. Embodiments of the present invention detail a program that can be used to dynamically determine the relative positioning of a multiple display grid and adjust the images transmitted to the displays.

Embodiments of the present invention will now be described in detail with reference to the Figures.

Figure 1:
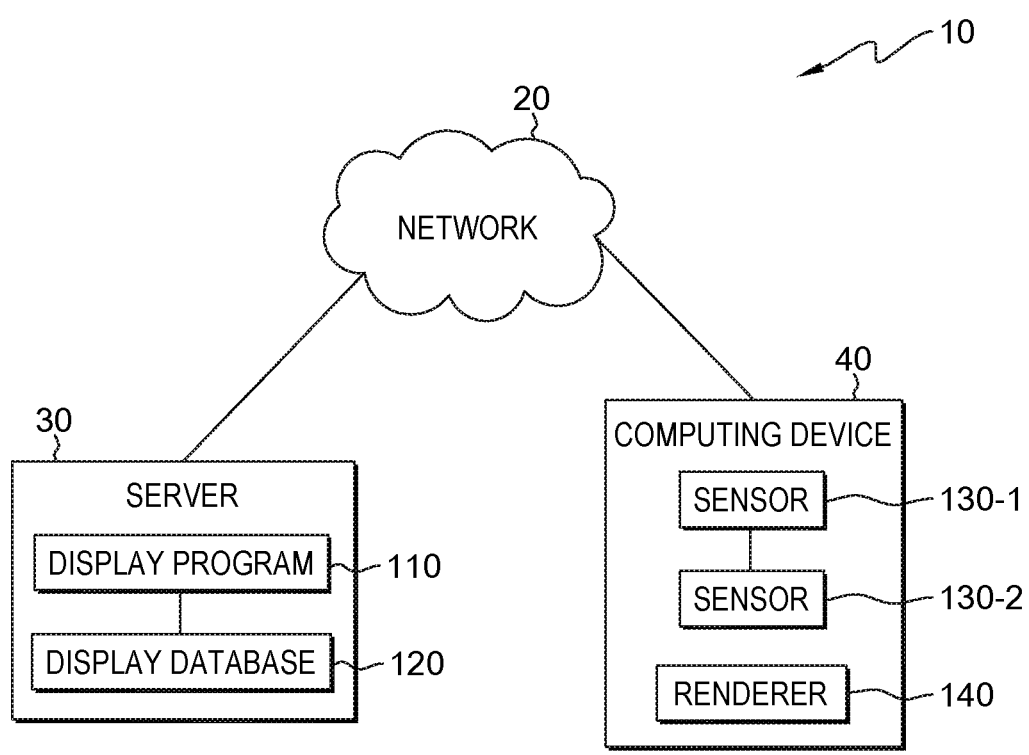
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing system 10 includes server 30 and computing device 40 interconnected over network 20. Network 20 may be a local area network (LAN), a wide area network (WAN) such as the Internet, a cellular data network, any combination thereof, or any combination of connections and protocols that will support communications between server 30 and computing device 40, in accordance with embodiments of the invention. Network 20 may include wired, wireless, or fiber optic connections. Computing system 10 may include additional computing devices, servers, or other devices not shown.

Server 30 may be a management server, a web server, or any other electronic device or computing system capable of processing program instructions and receiving and sending data. In some embodiments, server 30 may be a laptop computer, tablet computer, netbook computer, personal computer (PC), a desktop computer, or any programmable electronic device capable of communicating with computing device 40 via network 20. In other embodiments, server 30 may represent a server computing system utilizing multiple computers as a server system, such as in a cloud computing environment. In another embodiment, server 30 represents a computing system utilizing clustered computers and components to act as a single pool of seamless resources. In the depicted embodiment, server 30 contains display program 110 and display database 120. In other embodiments, server 30 may include other components, as depicted and described in further detail with respect to FIG. 4.

Computing device 40 may be a desktop computer, laptop computer, netbook computer, or tablet computer. In general, computing device 40 may be any electronic device or computing system capable of processing program instructions, sending and receiving data, and communicating with server 30 via network 20. In the depicted embodiment, computing device 40 contains sensors 130-1 and 130-2 and renderer 140. In other embodiments, computing device 40 may include other components, as depicted and described in further detail with respect to FIG. 4.

Display program 110 dynamically determines the relative positioning of a multiple display grid and adjusts the images transmitted to the displays. In doing so, display program 110 receives positioning information from sensors, such as sensor 130-1 and 130-2. Display program 110 analyzes the positioning information. Display program 110 connects images and cursor positioning. Display program 110 may stand alone or display program 110 may be embedded in renderer 140. In the depicted embodiment, display program 110 resides on server 30. In other embodiments, display program 110 may reside on another server or another computing device, provided that display program 110 can access display database 120, sensors 130-1 and 130-2, and renderer 140 via network 20.

Display database 120 may be a repository that may be written to and/or read by display program 110. In some embodiments, a program (not shown) may allow an administrator or other user to define various positions of a display grid and store the various positions of a display grid to display database 120. In other embodiments, display database 120 may store already determined positions of a display grid. In the depicted embodiment, display database 120 resides on server 30. In other embodiments, display database 120 may reside on another server or another computing device, provided that display database 120 is accessible to display program 110 via network 20.

Sensors 130-1 and 130-2 may be any device capable of detecting events or changes in an environment and providing a corresponding output. In one embodiment, sensors 130-1 and 130-2 may provide a corresponding output of a change in position to display program 110. In other embodiments, sensors 130-1 and 130-2 may provide a corresponding output of a change in position to renderer 140. Examples of sensors 130-1 and 130-2 may be, but are not limited to: near field communication (NFC) devices, radio-frequency identification (RFID) tags, Bluetooth® devices, accelerometers, and/or gyroscopes. In some embodiments, sensors, such as sensor 130-1 and 130-2 may be operably affixed to one or more display devices that make up a multiple display grid. For example, an NFC device or other sensor may be operably affixed (either internally or externally to the display casing) to each side of the display. Such an arrangement may allow for each sensor (e.g., sensor 130-1 or sensor 130-2) to detect other sensors, such as a sensor operably affixed to a side of a second display. In such an embodiment, a gyroscope may additionally be operably affixed to one or more of the displays (either internally or externally to the display casing) to detect orientation of the respective displays. In the depicted embodiment, sensors 130-1 and 130-2 reside on computing device 40. In other embodiments, sensors 130-1 and 130-2 may reside on another computing device or another server, provided that sensors 130-1 and 130-2 are accessible to display program 110 and renderer 140 via network 20.

Renderer 140 may be any rendering program used to process data from a scene file and output to a digital image or raster graphics image file. A scene file usually contains objects in a strictly defined language or data structure, containing geometry, viewpoint, texture, lighting, and shading information as a description of a virtual scene. Rendering has uses in architecture, video games, simulators, movie or TV visual effects, and design visualization, each employing a different balance of features and techniques. As a product, there are a wide variety of renderers available. In one embodiment, renderer 140 is integrated into larger modeling and animation packages. In other embodiments, renderer 140 is stand-alone. In some embodiments, renderer 140 is a free open-source project. Renderer 140 is a program that is based on a selective mixture of disciplines related to: light physics, visual perception, mathematics, and software development. In the depicted embodiment, renderer 140 resides on computing device 40. In other embodiments, renderer 140, or similar renderers, may reside on another computing device or another server, provided that renderer 140 has access to sensors 130-1 and 130-2 and is accessible to display program 110.

Embodiments of the present invention may include two or more sensors; thus, there can be a sensor 130-1, a sensor 130-2, and up to a sensor 130-n. The depicted embodiment uses sensor 130-1 and sensor 130-2 simply for illustrative purposes.

Figure 2:
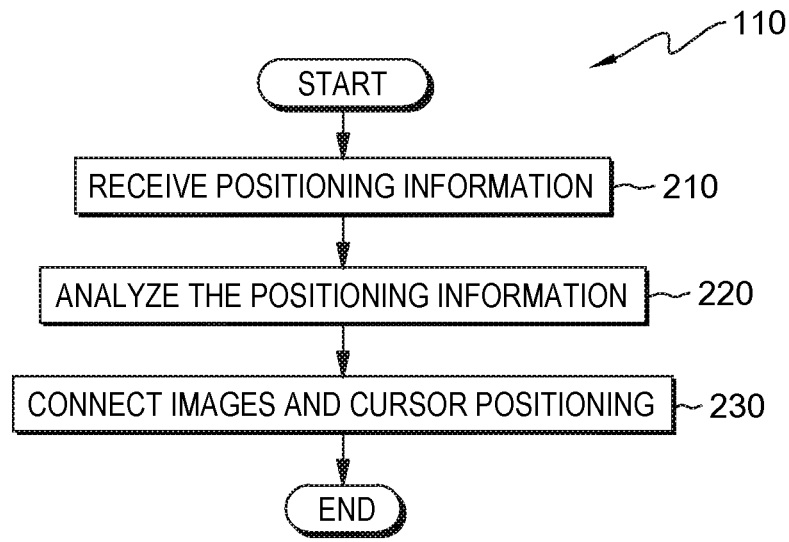
FIG. 2 depicts a flowchart of the steps of a display program, executing within the computing system of FIG. 1, for dynamically determining the relative positioning of a multiple display grid and adjusting the images transmitted to the displays, in accordance with an embodiment of the present invention.

FIG. 2 depicts a flowchart of the steps of a display program, executing within the computing system of FIG. 1, in accordance with an embodiment of the present invention. Display program 110 dynamically determines the relative positioning of a multiple display grid and adjusts the images transmitted to the displays.

In step 210, display program 110 receives positioning information. In one embodiment, display program 110 receives positioning information directly from sensors 130-1 and 130-2. In other embodiments, display program 110 receives positioning information from renderer 140 after renderer 140 receives the positioning information from sensors 130-1 and 130-2. In some embodiments, display program 110 receives the positioning information and stores the positioning information to display database 120.

As described above, examples of sensors 130-1 and 130-2 include, but are not limited to: NFC devices, RFID tags, Bluetooth® devices, accelerometers, and/or gyroscopes. In one embodiment, one or more sensors, such as sensors 130-1 and 130-2, are embedded along the edges of a display, such as display 1 310 or display 2 340 (seen in FIG. 3). When, for example, one or more displays are placed next to one another, the sensors (e.g., sensors 130-1 and 130-2) can provide information to display program 110, such that display program 110 forms an associative grid with the displays.

In step 220, display program 110 analyzes the positioning information. In one embodiment, display program 110 constructs a graph that represents the relative position of a set of displays, based on known sensor pairing associations. A sensor pairing association may be created when one or more sensors (e.g., sensor 130-1 and 130-2) detect another sensor. For example, if each of the one or more sensors are NFC devices operably affixed to one or more sides of displays, a first sensor affixed to a first side of a first display may detect a second sensor of a first side of a second display, and this information may be analyzed by display program 110, such that display program 110 determines that there is a sensor pairing association between the first sensor and the second sensor. Using this information, display program 110 may determine that the first display is positioned next to the second display, such that the first side of the first display and the first side of the second display are adjacent to one another. In other embodiments, display program 110 constructs and stores a graph that represents the relative position of a set of displays, based on known sensor pairing associations. In some embodiments, the graph is stored to display database 120.

In step 230, display program 110 connects images and cursor positioning. In doing so, display program 110 generates an extended display, or extended mode, where the extended display creates one virtual display with the added resolution of all participating displays. In one embodiment, renderer 140 positions the images on the displays as initially instructed by a user in the configuration panel. Subsequently, display program 110 rearranges the images and dynamically and seamlessly (without user intervention) connects the images and cursor positioning to follow the relative positioning and orientation of the set of displays in the multiple display grid, based on known sensor pairing associations. In other embodiments, display program 110 initially connects images and cursor positioning, dynamically and seamlessly, without requiring initial instructions by a user in the configuration panel. Still, in other embodiments, display program 110, via renderer 140, arranges the images by dynamically and seamlessly (without user intervention) connecting the images and cursor positioning to follow the relative positioning and orientation of the set of displays in the multiple display grid, based on known sensor pairing associations.

Figure 3:
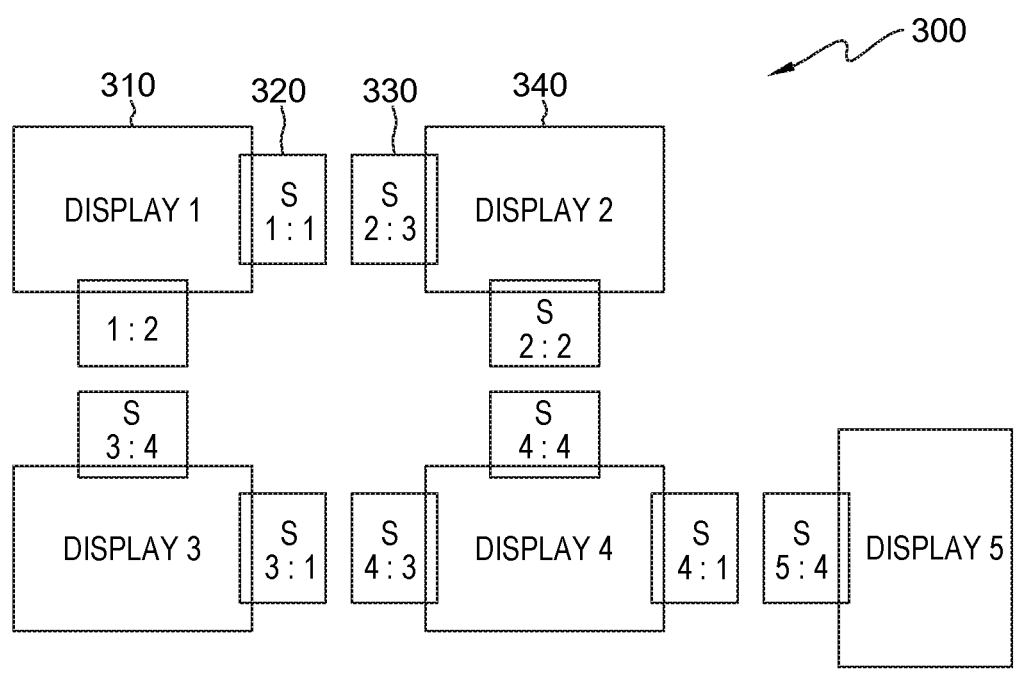
FIG. 3 depicts an example of a display grid, in accordance with an embodiment of the present invention.

In FIG. 3, environment 300 depicts an example of a display grid, in accordance with an embodiment of the present invention.

Environment 300 depicts a multiple display grid that includes Display 1 310, S 1:1 320, S 2:3 330, and Display 2 340. In the depicted embodiment, Display 1 310 and Display 2 340 are external displays (e.g., computer monitors). In the depicted embodiment, S 1:1 320 and S 2:3 330 are sensors (e.g., near-field communication, Bluetooth, radio-frequency identification), which are examples of sensors 130-1 and 130-2 (seen in FIG. 1) that are attached to the external displays. It should be noted that each of the sensors (e.g., S 1:1 320, S 1:2, S 2:3 330, S 2:2, S 3:1, S 3:4, S 4:1, S 4:3, S 4:4, and S 5:4) may be located internally or externally to each respective display. Further, there may be a greater or fewer number of sensors affixed to each display, and each display may include a different number of, and configuration of, sensors.

As an example, in step 210 of FIG. 2, display program 110 may receive position and orientation information from S 1:1 320 and S 2:3 330 concerning the space and proximity of Display 1 310 in relation to Display 2 340. When S 1:1 320 and S 2:3 330 come in proximity, a pairing association is dynamically established and communicated to display program 110 and/or renderer 140. Notice that in the case of Display 5, since the association is made between sensors S 4:1 and S 5:4, display program 110 can determine that Display 5 is in a vertical position instead of a horizontal position like all of the other displays. The communication of pairing data from the displays to display program 110 and/or renderer 140 may occur over existing channels, such as a cable linking the display to a computing device or a network connection established between the display and a computing device.

Figure 4:
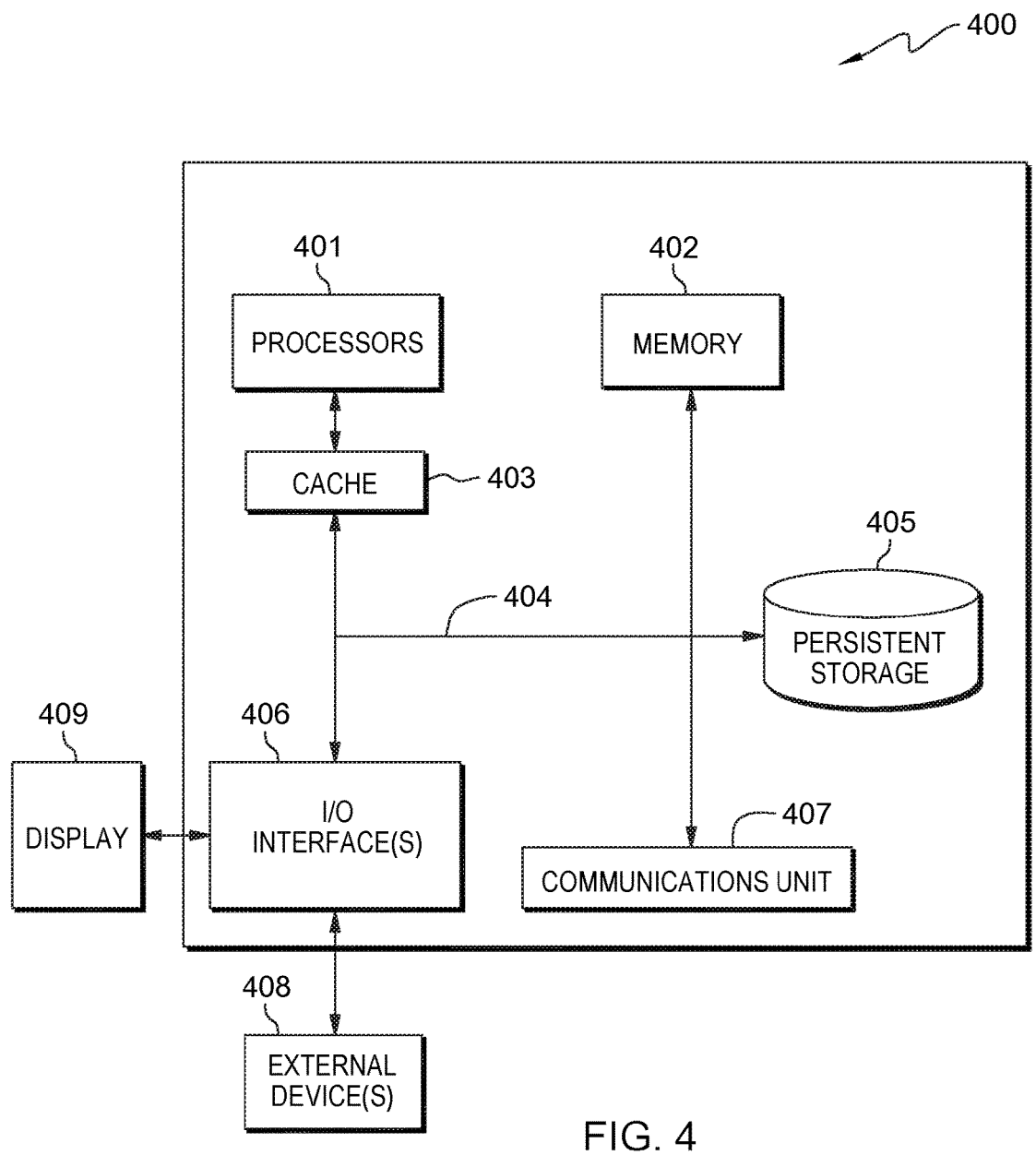
FIG. 4 depicts a block diagram of components of the server and/or the computing device of FIG. 1, in accordance with an embodiment of the present invention.

FIG. 4 depicts computer system 400, which is an example of a system that includes components of server 30 and/or computing device 40. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407. Display program 110 and display database 120 may be downloaded to persistent storage 405 of server 30 through communications unit 407 of server 30. Sensors 130-1 and 130-2 and renderer 140 may be downloaded to persistent storage 405 of computing device 40 through communications unit 407 of computing device 40.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., display program 110 and display database 120, can be stored on such portable computer readable storage media and can be loaded onto persistent storage 405 of server 30 via I/O interface(s) 406 of server 30. Software and data used to practice embodiments of the present invention, e.g., sensors 130-1 and 130-2 and renderer 140, can be stored on such portable computer readable storage media and can be loaded onto persistent storage 405 of computing device 40 via I/O interface(s) 406 of computing device 40. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer system for determining relative positioning in a multiple display grid, the computer system comprising:
   one or more computer processors, one or more computer readable storage media, and programs stored on the one or more computer readable storage media for execution by at least one of the one or more processors, the program instructions comprising:
   program instructions to receive positioning information from a renderer after the renderer receives the positioning information from, at least, a first sensor and a second sensor operably affixed to at least a first display, at least, a third sensor and a fourth sensor operably affixed to a second display, and, at least, a fifth sensor and a sixth sensor operably affixed to a third display, wherein the sensors include near field communication (NFC) devices, radio-frequency identification (RFID) tags, Bluetooth devices, accelerometers, and gyroscopes;

program instructions to analyze the positioning information to determine a relative positioning and orientation between, at least, the first display, the second display, and the third display by creating a sensor pairing associations between the first sensor and the third sensor and between the second sensor and the fifth sensor, wherein a graph is constructed, based on the sensor pairing associations, that represents the relative positioning and orientation of, at least, the first display, the second display, and the third display; and program instructions to generate an extended display on, at least, the first display, the second display, and the third display, based on the analyzed positioning information, wherein images on the extended display are arranged dynamically and seamlessly without user intervention.

* * * * *